US007484445B2

(12) United States Patent
De Marco et al.

(10) Patent No.: US 7,484,445 B2
(45) Date of Patent: Feb. 3, 2009

(54) PUNCHING AND/OR PERFORATING EQUIPMENT FOR CONTINUOUS FORMS

(75) Inventors: Giuliano De Marco, Ivrea (IT); Armando Aprato, Lugnacco (IT); Francesco Terrusi, Milan (IT); Alberto Massucco, Ivrea (IT)

(73) Assignee: Tecnau S.R.L. (IT)

( * ) Notice: Subject to any disclaimer, the term of this patent is extended or adjusted under 35 U.S.C. 154(b) by 243 days.

(21) Appl. No.: 10/859,071

(22) Filed: Jun. 3, 2004

(65) Prior Publication Data

US 2005/0034582 A1 Feb. 17, 2005

(51) Int. Cl.
*B23D 25/02* (2006.01)

(52) U.S. Cl. ............................ 83/342; 83/469; 83/343; 83/678; 83/671

(58) Field of Classification Search .................. 83/469, 83/341, 342, 343–348, 678, 671
See application file for complete search history.

(56) References Cited

U.S. PATENT DOCUMENTS

| | | | | |
|---|---|---|---|---|
| 3,543,622 | A * | 12/1970 | Rice | 83/117 |
| 3,552,251 | A * | 1/1971 | Neff et al. | 83/299 |
| 3,570,348 | A * | 3/1971 | Hallden | 83/342 |
| 3,606,811 | A * | 9/1971 | Hallden | 83/305 |
| 3,606,813 | A * | 9/1971 | Hallden | 83/672 |
| RE28,911 | E * | 7/1976 | Jespersen et al. | 225/96 |
| 4,014,234 | A * | 3/1977 | Spengler | 83/162 |
| 4,183,271 | A * | 1/1980 | Martin | 83/156 |
| 4,651,605 | A * | 3/1987 | Dean, II | 83/209 |
| 5,456,684 | A * | 10/1995 | Schmidt et al. | 606/41 |
| 5,768,964 | A * | 6/1998 | Meschi | 83/33 |
| 5,894,778 | A | 4/1999 | Mori | |
| 6,006,637 | A * | 12/1999 | Sanders et al. | 83/53 |
| 6,018,687 | A * | 1/2000 | Tabor | 700/125 |
| 6,101,912 | A * | 8/2000 | Sanders et al. | 83/53 |

(Continued)

FOREIGN PATENT DOCUMENTS

DE 92 11 522 U 10/1992

OTHER PUBLICATIONS

"Servomechanism". From Wikipedia. Printed Jan. 24, 2007.*

(Continued)

*Primary Examiner*—Kenneth E. Peterson
*Assistant Examiner*—Sean Michalski
(74) *Attorney, Agent, or Firm*—Banner & Witcoff, Ltd.

(57) ABSTRACT

A punching and/or perforation equipment (33, 34) for continuous paper forms (37, 42) comprising punching and/or perforation member (81; 226, 227) and contrast elements (82; 224) substantially tangent to the movement surface (63, 204) of the forms and a punching and/or perforation mechanism (56, 57; 197, 198) for driving the punching and/or perforation members. A detecting device (92, 93; 244, 245) detects at least one reference position the forms associated with the punching and/or perforation positions and a servomechanism (87, 88; 228, 229) actuates the punching and/or perforation mechanism on the basis of the reference position or positions between a state of rest and a state of punching and/or perforation and in which the reference position or positions are associated with information of a position encoder (72, 214). The punching and/or the perforation members cooperate with the form with a peripheral velocity, at the moment of the punching and/or perforation, substantially equal to the velocity of the moving form (37, 42).

6 Claims, 11 Drawing Sheets

U.S. PATENT DOCUMENTS

| | | | | |
|---|---|---|---|---|
| 6,178,859 | B1 * | 1/2001 | Pomerleau et al. | 83/76.9 |
| 6,289,777 | B1 * | 9/2001 | Hartmann et al. | 83/30 |
| 6,955,122 | B2 * | 10/2005 | Seiler et al. | 101/226 |
| 7,117,777 | B1 * | 10/2006 | Wilkes | 83/320 |
| 2001/0049990 | A1 * | 12/2001 | Takaishi et al. | 83/628 |
| 2003/0172785 | A1 * | 9/2003 | Formon et al. | 83/37 |

OTHER PUBLICATIONS

"Microscope Stages", http://www.motioncontrol-products.com/linear-rotary-stages.htm. Accessed on Jun. 30, 2007.*

Partial European Search Report dated Jan. 17, 2005.

* cited by examiner

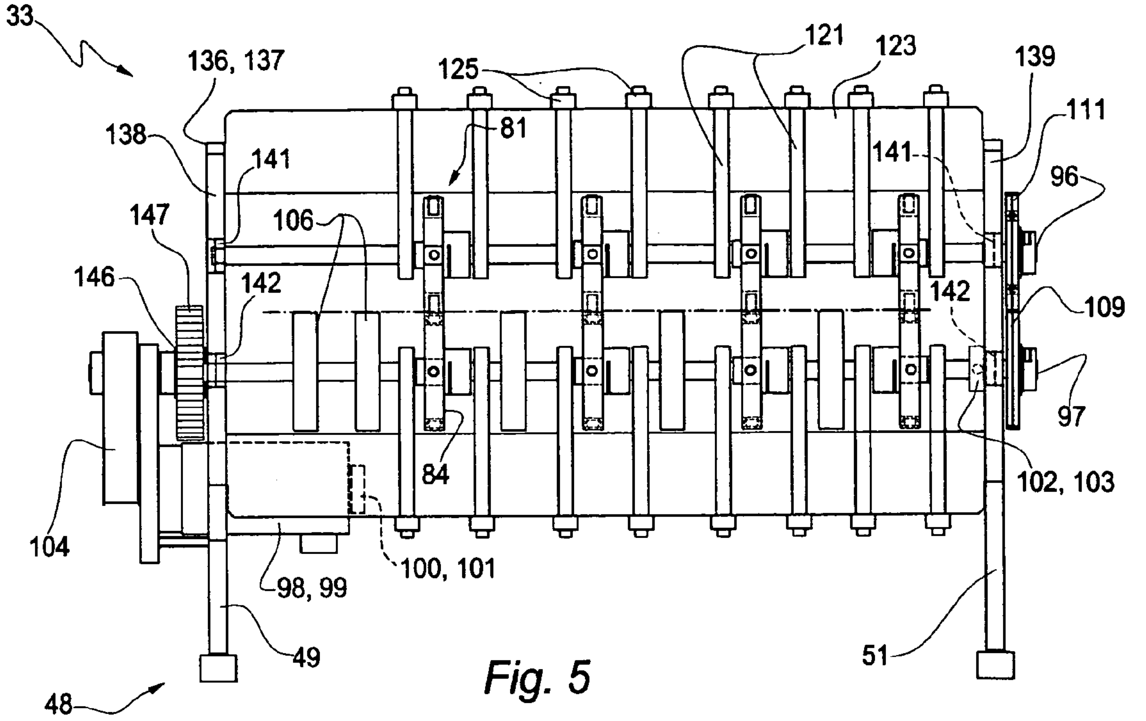
Fig. 5
Fig. 4
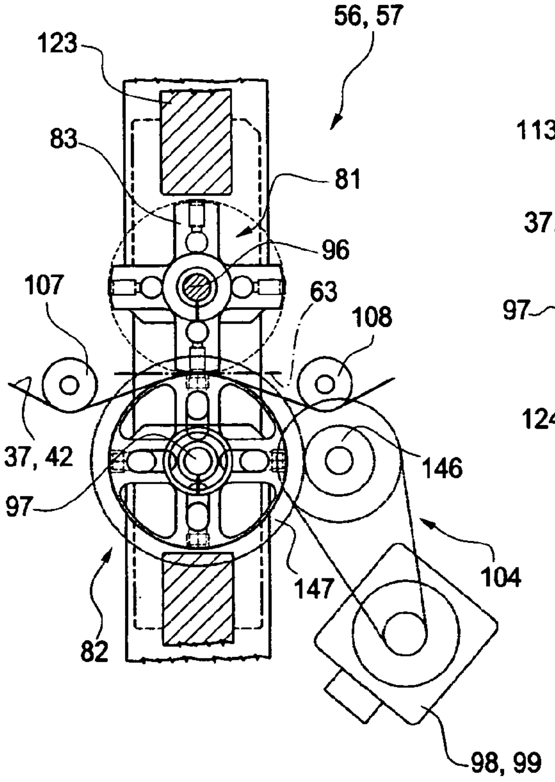
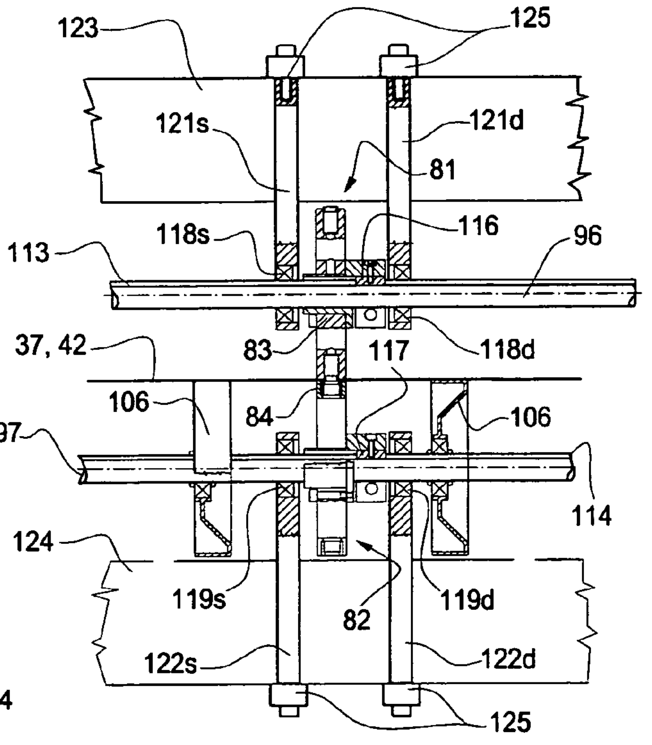
Fig. 6

PUNCHING AND/OR PERFORATING EQUIPMENT FOR CONTINUOUS FORMS

FIELD OF THE INVENTION

The present invention relates to a punching and/or perforating equipment for continuous forms. More specifically, the invention relates to a punching and/or perforating equipment for continuous paper forms comprising a punching or a perforating mechanism having punching or perforating members and actuatable for driving the punching or perforating members between a state of rest spaced apart from the paper form and a state of punching or perforating for the form, and wherein the punching or perforating members are moveable along trajectories substantially tangent to the movement surface of the forms.

BACKGROUND OF THE INVENTION

Punching and/or perforating equipments of this type are included in systems for the automatic processing of documents for punching holes and/or executing transversal thin holes or perforations in continuous forms of paper webs. The forms are supplied, in general, downstream of high speed printers or downstream of suitable unwinding devices.

Such treatments are executed for accomplishing documents which an end user can file, through side holes, in more or less standard ring binders and/or for separating the sheets through facilitated torn off of some portions of the paper form. The transversal perforations are also useful for zig-zag folding the forms along corresponding weakening lines and obtaining regular stacks of easy handling.

Off-line special devices are generally provided for executing the holes of documents to be filed in ring or pin binders. Such devices include punch and die mechanisms with linear actuation which work on the sheets previously separated from. the web and suitable stacked.

Punching devices for photocopying machines, comprising couples of rotating punches and dice are also known. The punches and the dice cooperate with the moving copied sheet and are carried by corresponding rollers tangent to the trajectory of the sheet and kinematically connected one another. An edge sensor detects the passage of an edge of the sheet to be punched and a controlled motor puts in rotation the punches-dice couple and punches the holes at given points of the sheet in response to the information of the edge sensor.

These known punching devices are not suitable for executing holes in continuous forms. In fact, the sole leading edge of the paper web does not ensure a sufficient precision in the positions of the punches with respect to all the documents which can be obtained by the paper web.

Perforation equipments with actuating mechanisms synchronous with the movement of advancing of the form are used for the formation of transversal perforations in continuous paper webs. Such equipments comprise rollers with perforation blades and counter-rollers, heavy and bulky, univocally provided for a single perforation pitch. The accomplishment of perforations of different features requires the substitution of some mechanisms with increasing of costs and drawbacks due to the downtimes and the necessity of using qualified personnel.

SUMMARY OF THE INVENTION

An object of the present invention is to accomplish a punching and/or perforating equipment for continuous forms which ensures a high productivity and having the possibility of executing punches and/or perforations of different features with limited costs.

This end is obtained by the punching and/or perforating equipment for continuous forms of the type above specified, according to the characteristic portions of the principal claims.

In this context, a technical problem of the invention is to accomplish a punching or a perforating equipment for continuous forms, reliable and of high velocity, in which it is possible to easily modify the pitch and the technical features of the punches or the perforations.

According to a first feature, the punching or perforating equipment further comprises means for setting given punching or perforating positions on said paper form; a moving device for moving the paper form at a predetermined advancement velocity; a detecting device for detecting at least one reference position associated with said forms; a position encoder for feeding a current position information of said form; and a servomechanism for actuating, based on said at least one reference position and on said current position information, the punching or perforating mechanism to move the punching or perforating members in the state of punching or perforating in said given punching or perforating positions. Further, the servomechanism causes the punching or perforating members to provide a peripheral velocity, at the moment of the punching or perforating, substantially equal to the advancement velocity of the paper form.

Another problem of the invention is to accomplish a punching equipment for continuous forms, fast and of high reliability, in which it is possible to easily modify the transversal pitch and the technical features of the punches.

The perforating equipment comprises a contrast roller substantially tangent to the movement surface of the form, a perforating blade carried by a blade support provided for rotation in a condition of interference with said form against the contrast roller for the execution of transversal weakening perforations on the form in movement. Said equipment further comprises a servomechanism responsive to position indications of the form for rotating said blade support from a condition of disengagement of the perforation blade to the condition of interference and to the condition of disengagement. The contrast roller and the blade support have respective rotation axes substantially parallel one another and slightly inclined with respect to a reference axis perpendicular to the direction of movement of the form. The perforation blade is defined by a helical cutting edge having an inclination angle equal to the angle of inclination of said rotation axes with respect to the reference axis for a progressive perforating from a side edge to the other side edge of said form; and the servomechanism provides a peripheral velocity of the perforation blade, at the moment of the perforation, substantially equal to the moving velocity of the paper form.

A further object of the invention is to accomplish a perforating equipment for continuous forms, fast and of high reliability, in which it is possible to easily modify the pitch and the technical features of the perforations.

The perforating equipment comprises a contrast roller substantially tangent to the movement surface of the form, a perforating blade carried by a blade support provided for rotation in a condition of interference with said form against the contrast roller for the execution of transversal weakening perforations on the form in movement. Said equipment further comprises a servomechanism responsive to position indications of the form for rotating said blade support from a condition of disengagement of the perforation blade to the condition of interference and to the condition of disengagement. The contrast roller and the blade support have respective rotation axes substantially parallel one another and slight inclined with respect to a reference axis perpendicular to the direction of movement of the form. The perforation blade is defined by an helical cutting edge having an inclination angle equal to the angle of inclination of said rotation axes with respect to the reference axis for a progressive perforating from a side edge to the other side edge of said form; and the servomechanism provides a peripheral velocity of the perforation blade, at the moment of the perforation, substantially equal to the moving velocity of the paper form.

The characteristics of the invention will become clear from the following detailed description of a preferred embodiment, provided merely by way of non restrictive example, with the aid of the accompanying drawings, wherein:

BRIEF DESCRIPTION OF THE DRAWINGS

FIG. 4 represents, in enlarged scale, other details of FIG. 2

FIG. 5 represents a schematic front view of the punching equipment of FIG. 2;

FIG. 6 shows, in enlarged scale, some details of FIG. 5;

DESCRIPTION OF THE PREFERRED EMBODIMENTS

Figure 1:
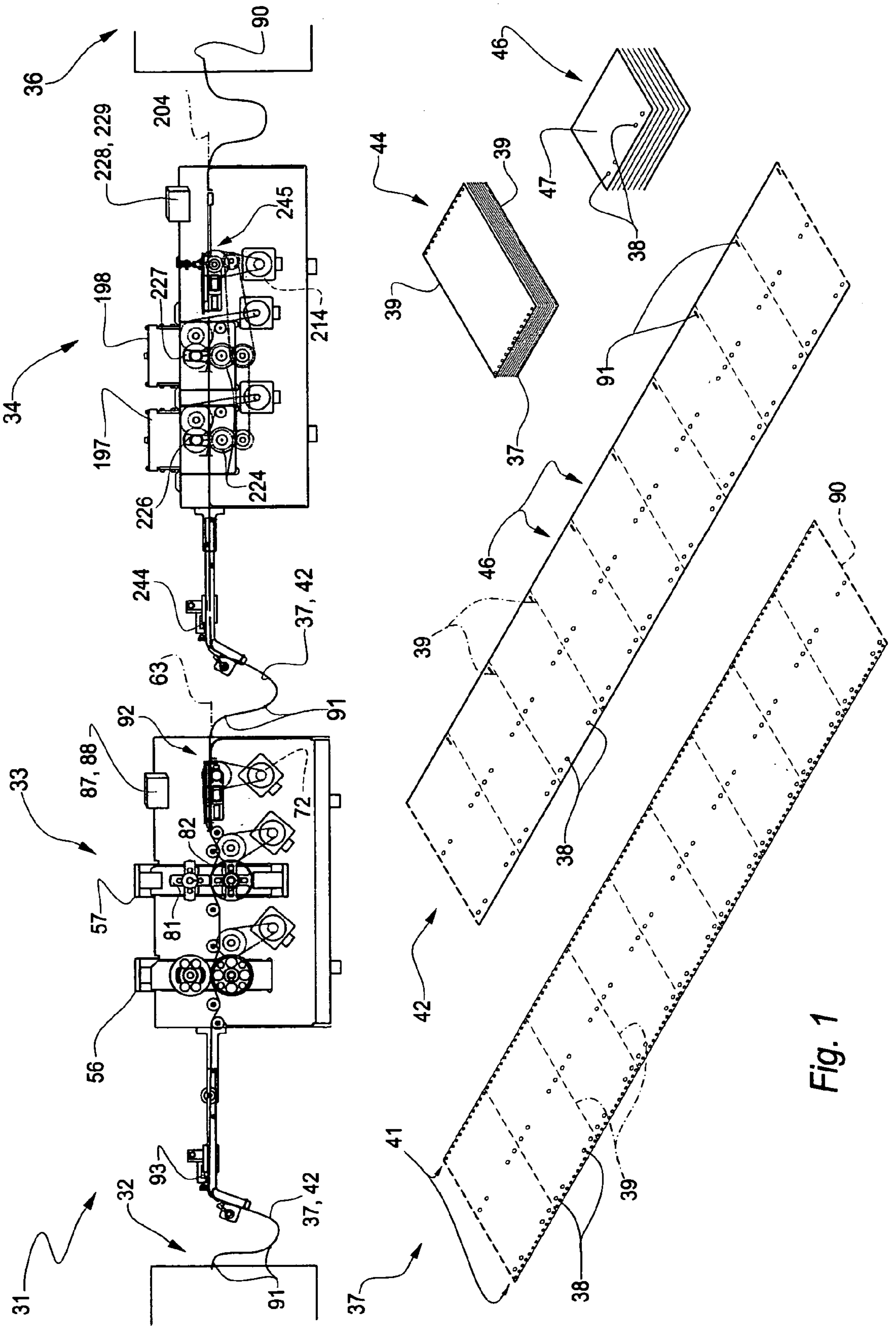
FIG. 1 represents a scheme of a system for the automatic processing of documents comprising a punching equipment and a perforating equipment for a continuous form according to the invention.
Figure 2:
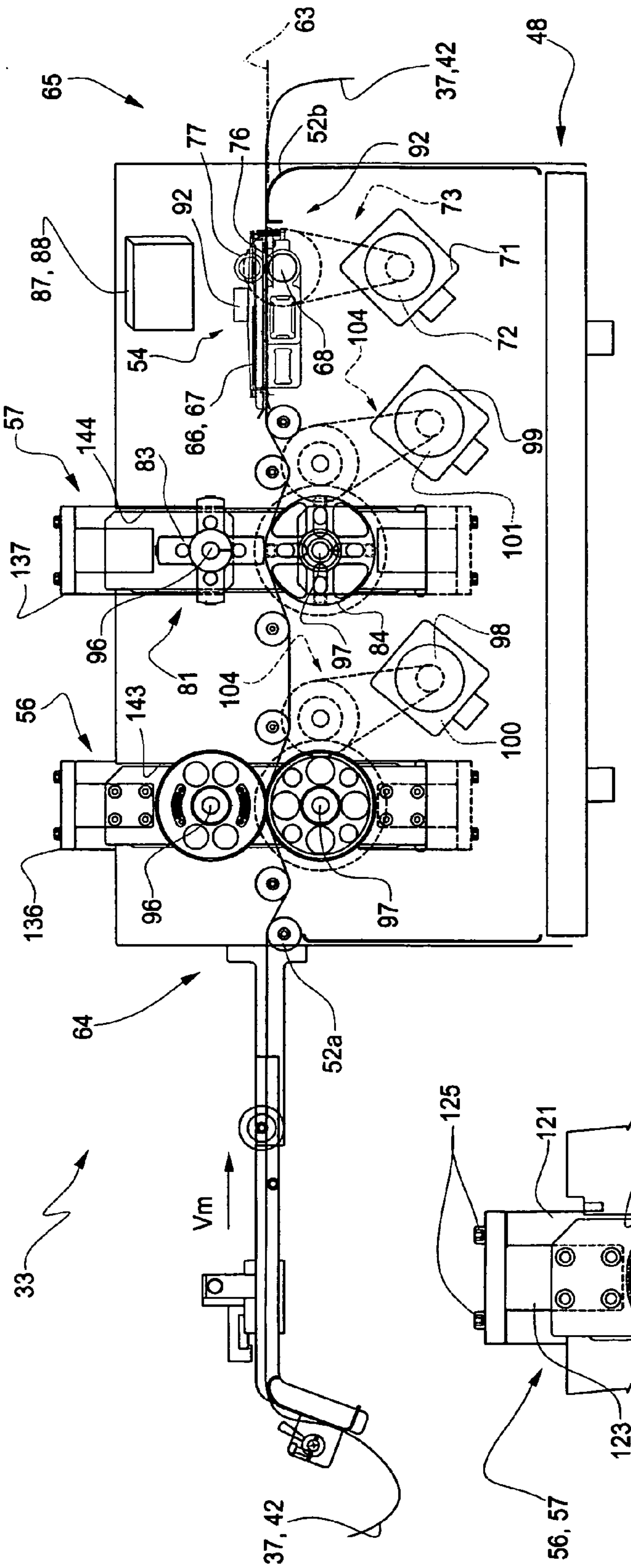
FIG. 2 shows schematically a sectioned side view of the punching equipment of FIG. 1.
Figure 3:
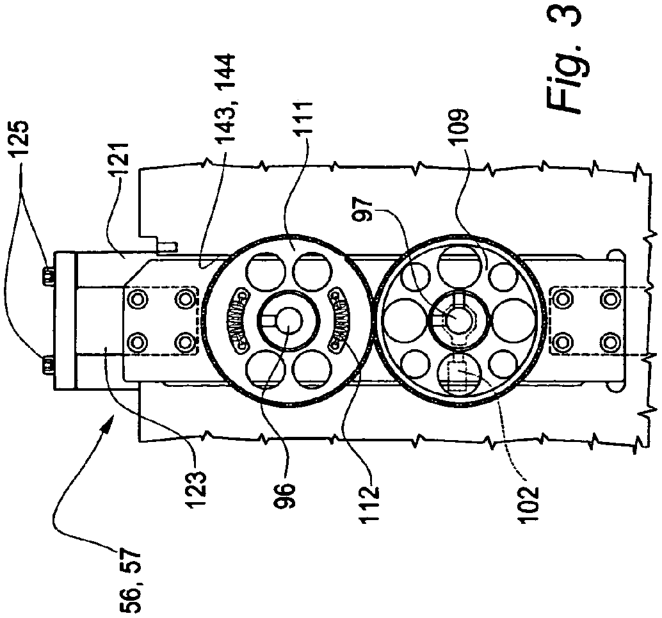
FIG. 3 shows, in enlarged scale, some details of FIG. 2.
Figure 7:
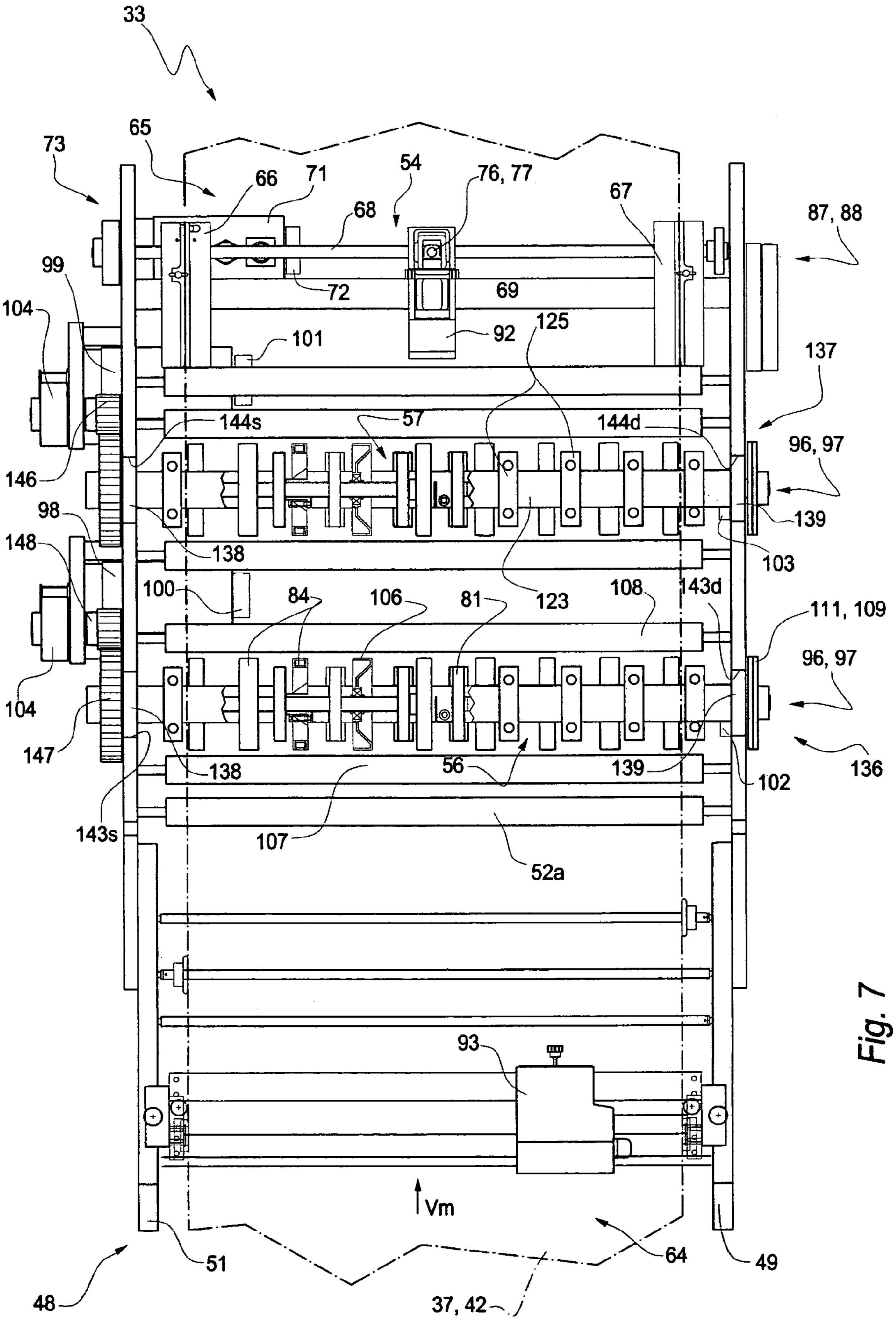
FIG. 7 represents a schematic plan view of the punching equipment of FIG. 2.
Figure 9:
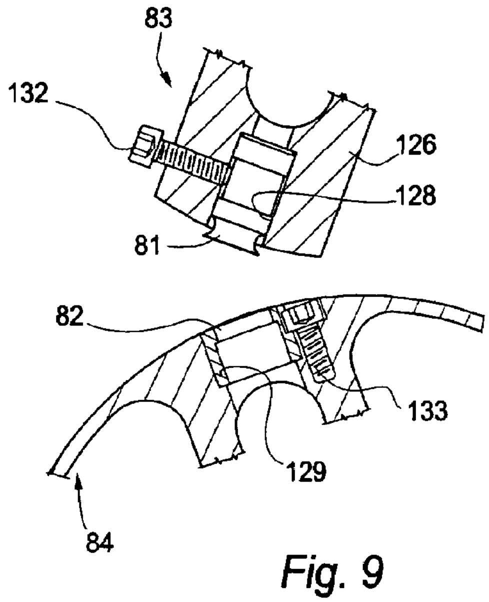
FIG. 9 shows, in a further enlarged scale, some details of FIG. 8 in a different configuration.
Figure 8:
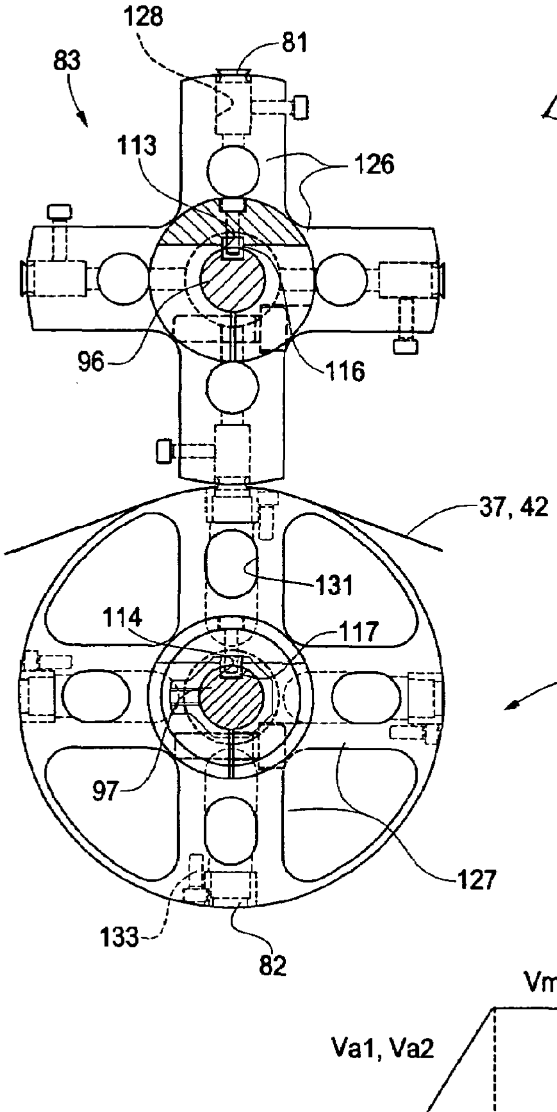
FIG. 8 shows, in enlarged scale, some details of FIG. 4.

Represented with 31 in FIG. 1 is a system for the automatic processing of documents comprising a high speed printer 32, a punching equipment 33, a perforating equipment 34 and a finishing equipment 36.

The system 31 uses a continuous form 37 of a respective paper web: the punching equipment 33 is provided for executing holes 38, for ring or pin file binders, transversally and longitudinally to the form 37; and the perforating equipment 34 is provided for executing transversal weakening perforations 39 to facilitate the folding of the form or the torn off separation of single sheets.

The forms 37 includes side sprocket holes 41; however, also forms 42 devoid of holes can be used. The printer 32 is of known type, for instance of laser technology, and prints the information regarding the sheet or all the sheets constituting the various documents on the forms 37, 42.

The finishing equipment 36 can include a folder to obtain, from the form 37, 42, stacks 44 in which the form is fan folded along the weakening perforations 39.

The equipment 36 can include cutting mechanisms and sequencers to form stacks 46 of sheets 47 sectioned from the form 37, 42 and in which the holes 38 are on a margin of the sheets 47 for an easy insertion in a file binder by the end user.

The equipments 33 and 34 can also be used in association with other finishing apparatuses and, off-line the printing, for receiving a paper web from an unwinding device not shown. In the case of on-line use, suitably controlled loop sections and velocity regulators between the various equipments can be provided on the form 37 for a correct moving of the form.

Punching Equipment

The punching equipment 33 (FIGS. 2-9) comprises a frame 48 with two sides 49 and 51 and elements of support and guide 52*a*and 52*b* for the form 37, 42.

For the advancing of the forms 37, 42 the equipment 33 includes a moving device 54 which can use pin feed tractors for the holed forms 37 and moving rollers and pinch rollers for the un-holed forms 42. A punching mechanisms or a pair of punching mechanisms 56 and 57 of the type including punches and rotating dice, as represented in the figures, provide to the execution of the holes 38.

The punching equipment 33 includes a power and control system for the various electromechanic components, comprising a microprocessor 58 (FIG. 11) with a basic program, an electronic control module 61 and a control console 62.

The elements 52*a* and 52*b* (FIGS. 2 and 7) are adapted to support and drive the form 37, 42 along a substantially horizontal movement surface 63 between an input area 64 and an output area 65. The mechanisms 56 and 57 are arranged one behind the other starting from the input area 64, while the moving device 54 is adjacent to the output area 65.

Specifically, the moving device 54 includes two paper pressing members 66 and 67, a motor axis 68, a support bar 69 for the paper pressing member 66 and 67 and a motor 71. The axis 68 and the bar 69 are mounted between the sides 49 and 51 of the frame 48 and the motor 71 is mounted on the side 51. The paper pressing members 66 and 67 include respective side guides for the form and have possibility of transversal regulation along the bar 69. A position encoder 72 is coupled to the shaft of the motor 71 and a transmission assembly 73 with pulleys and toothed belts interconnects the axis 68 with the shaft of the motor 71.

By way of example, the motor 71 is of brushless D.C. type. The encoder 72 supplies pulses Stm (FIG. 11) in response to given angular steps of the shaft of the motor 71 corresponding to incremental advancing steps of the form 37, 42 (FIGS. 1, 2 and 7), along the movement surface 63, in a manner known per se. The advancing steps of the form 37 are determined by the pins of the tractors while the advancing steps of the form 42 are determined by the moving rollers and the pinch rollers.

For the use with the holed forms 37 two tractors, not shown, of endless belt type with dragging pins are associated to the paper pressing members 66 and 67. The tractors are provided for cooperating with the sprocket holes 41 of the form and the respective motor pulleys are connected in the rotation with the axis 68.

For the use with the forms 42 devoid of holes, the moving device 54 can provide a motor roller 76 of the same width of the form 42, rotatably connected with the shaft of the motor 71 and a pinch roller 77 arranged in a central position with respect to the paper form.

The punching mechanisms 56 and 57 include a set or more sets of punches-dice, each one having punches 81 and dice 82 respectively carried by cylindrical punch-holder sectors 83 and by die-holder drums 84. The sectors 83 and the drums 84 are substantially tangent to the movement surface 63 of the form 27 and are kinematically connected one another.

According to the invention, the equipment 33 includes a detecting device 86 (FIG. 11) for detecting a reference position or more reference positions associated with the form 37, 42 and a servomechanism or two servomechanisms 87 and 88 for controlling a single punching mechanism or, respectively, the two punching mechanisms 56 and 57 on the basis of the program of the microprocessor 58 and the data set by means of the console 62.

The servomechanism or the servomechanisms 87 and 88 are of closed loop type and respond to the reference position or positions and to the set data to put in movement the set of punches-dice or the sets of punches-dice, for engaging the punches 81 with the dice 82 and punching the form in the wished positions and according to a given law of motion. In particular, the imposed peripheral velocities of the sectors 83 and the drums 84, at the moment of the punching, is such to be substantially equal to the moving velocity Vm of the paper form 37, 42.

Suitably, the reference position of the sheet to which associate the areas to be punched is obtained by the pulses Stm of the position encoder 72, which are synchronized by the reference position or positions of the device 86.

In the case of the holed forms 37, the synchronization between the moving form and the encoder 72 is ensured by the engagement of the side sprocket holes 41 with the pin tractors and by the connection of the tractors with the motor axis 68 for the whole length of the form, while the indication on the reference position of the sheet is obtained by the leading edge 90 during the initialization phase of the equipment 33.

In the case of the un-holed forms 42, the motor roller 76 can slip and a continuous synchronization between the movement of the form and the one of the encoder 72 cannot be ensured. Insofar, the indication on the reference position of each sheet is obtained by reference marks 91 which are printed by the printer 32 on a side margin of the form 42 in a predetermined position of each section of the form which defines the sheet 46 or a given set of sheets forming the document.

For the advancing of the form defining the sheet 46 or to the set of sheets defined by the marks 91, the synchronization with the encoder 72 is ensured. According to a technique note, the marks 91 can be constituted by segments and the positions can be arranged at areas of the form corresponding to the portions to be cut together with the definition of the sheet 46 or the set of sheets of the document.

In detail, the detecting device 86 includes a sensor 92, for instance of photoelectric type, arranged between the paper pressing members 66 and 67 to detect at a given position a leading edge 90 of the form 37 engaged and moved by the pin feed tractors.

The detecting device 86 further includes a sensor 93, also of photoelectric type, arranged at a side of the frame 48 adjacent to the input area 64 to detect, at a given position, the reference marks 91 for each sheet 46 or for each set of sheets of the un-holed forms 42.

The punching mechanisms 56 and 57 include, each one, shafts 96 and 97 on which are keyed one or more couples of punch-holder sectors 83 and die-holder drums 84 associated with respective transversal areas of the form 37, 42. The shafts 96 and 97 are actuated for the rotation by motors 98 and 99 of the servomechanisms 87 and 88, through transmission assemblies 104.

Also the motors 98 and 99 are of brushless D.C. type and the position of the motor shafts are defined by position encoders 100 and 101 which supply pulses St1 and St2 (FIG. 9) at given angular steps of the shafts. Two synchronizing sensors 102 and 103, for instance of inductive type, provide respective zero reference positions for the shafts 97 of the mechanisms 56 and 57 to which correspond starting disengagement conditions of the punches 81 from the dice 82.

Two support rollers 106 for the form 37, 42, are provided at the two sides of each drum 84. The rollers 106 are idle mounted on the axis 97 and, in section, have substantially the same diameter of the drums 84. Further, the form 37, 42 is forced to lean on the drums 84 and on the rollers 106 by intermediate rollers 107 and 108 arranged upstream and downstream of the punching areas, adjacent to the movement surface 63.

For reliable operations in the time, the shafts 96 and 97 of each mechanism 56, 57 are kinematically connected by gears 109 and 111 of no backlash type. As an example, the gear 109 of each mechanism 56, 57 is keyed on the shaft 97 and the gear 110 is double-sectioned and the teeth of the double-sectioned portions are maintained in constant engagement with the teeth of the gear 109 by means of springs 112, according to a known technique.

The shafts 96 and 97 have respective grooves 113 and 114 and the sectors 83 and the drums 84 are provided of hubs having keys 116 and 117 integral in the rotation with the shafts 96 and 97. The punches-dice sets have possibility of axial shifting along the shafts 96 and 97 for the execution of the holes 38 in the wished areas of form associated with the single couple. The keys 116 and 117 can be locked in the grooves 113 and 114 when the position of coaxiality of the punches with respect to the dice has been reached.

A reliabile engagement of the punches-dice couples is ensured by a high flexural rigidity of the shafts 96 and 97 without substantial increasing of the inertial masses. To this end, each sectors 83 and each drum 84 is supported in the rotation by a pair of adjacent bearings 118*s* and 118*d* and, respectively, 119*s* and 119*d*. The bearings are mounted on respective supports 121*s* and 121*d* and 122*s*, 122*d*, in turn supported by stiffening beam 123 and 124, with possibility of transversal shifting according to the position of the pairs punches-dice and can be locked by means of screws 125.

Specifically, in each dice holder, the sectors 83 have four cross-wise arms 126 having respective seats 128 for four punches 81 and the drum 84 has four cross-wise arms 127 with seats 129 for four dice 82. The sectors 83 and the drums 84 are in a light alloy, for instance of aluminum and the punches 81 and the dice 84 are in steel of high hardness. The arms 121 define large openings 131 for an easy expulsion of the portions of paper sized after the punching from the form 37, 42.

The punches 81 can be locked in the seats 126 (FIGS. 2 to 7) by means of screws 132 threaded on the sides of the sectors 83, while the dice 82 can be locked by screws 133 whose heads are recessed with respect to the surface of the drum 84.

According to another aspect of the invention, the servomechanisms 87 and 88 (FIGS. 2 and 11) can actuate the punching mechanisms 56 and 57 in alternate way for punching holes 38 of limited pitch, with a velocity of the paper form 37, 42 twice the velocity required for punching the holes with a single mechanism. Further, the servomechanisms 87 and 88 can actuate the mechanisms 56 and 57 to execute holes 38 having differentiated pitches.

The punching mechanisms 56 and 57 (FIGS. 2 to 7) are carried by modular groups 136 and 137 which comprise, each one, two small sides 138 and 139 on which the stiffening beam 123 and 124 are firmly fixed. The small sides 138 and 139 are at the same distance of the sides 49 and 51 of the frame 48 and support the shafts 96 and 97 by means of bearings 141 and 142. The gears 109 and 111 are mounted on a cantilever end of the shafts 97 and 96 projecting from the small side 139.

Conveniently, the modular groups 136 and 137 of the equipment 33 are provided for being manually removable and remountable with respect to the frame 48. To this end, the small sides 138 and 139 are mounted with precision in couples of notches 143*s*, 143*d* and 144*s*, 144*d* on the higher edges of the sides 49 and 51.

The motors 98 and 99 are mounted on the side 49 of the frame 48 and each transmission assembly 104 includes a pinion 146, an intermediate toothed belt and a gear 147. The pinion 146 of each mechanism 56, 57 is rotatably supported by an intermediate shaft 148 of the side 49 and the intermediate toothed belt connects the output shaft of the motor 98 or 99 with the pinion 146. The gear 147 is keyed on a cantilevered end of the shafts 97 projecting externally from the small side 138 and, in condition of use, this gear is in meshing with the pinion 146.

The synchronizing sensors 102 and 103 are fixed on the side 51 of the frame 48 and are designated for detecting zero positions of the shafts 97 in the mechanisms 56 and 57 when these mechanisms are correctly installed in the equipment 33.

The modular groups 136 and 137 are fixed on the higher edges of the sides 49 and 51 by means of locking elements and keys, not shown, which co-operate with the small sides 138 and 139. For the removal of a group 136, 137 it is sufficient to disengage the locking elements and lift the group out of the frame 48, with uncoupling of the gear 147 from the pinion 146.

The removability of the modular groups 136 and 137 ensures an easy substitution of the mechanisms 56 and 57, minimizing the downtimes in the case of replacement of the punches 81 and of the dice 82 and, in general, in the normal maintenance. The substitution of the mechanisms 56 and 57 with mechanisms of different features is also simplified.

Figure 11:
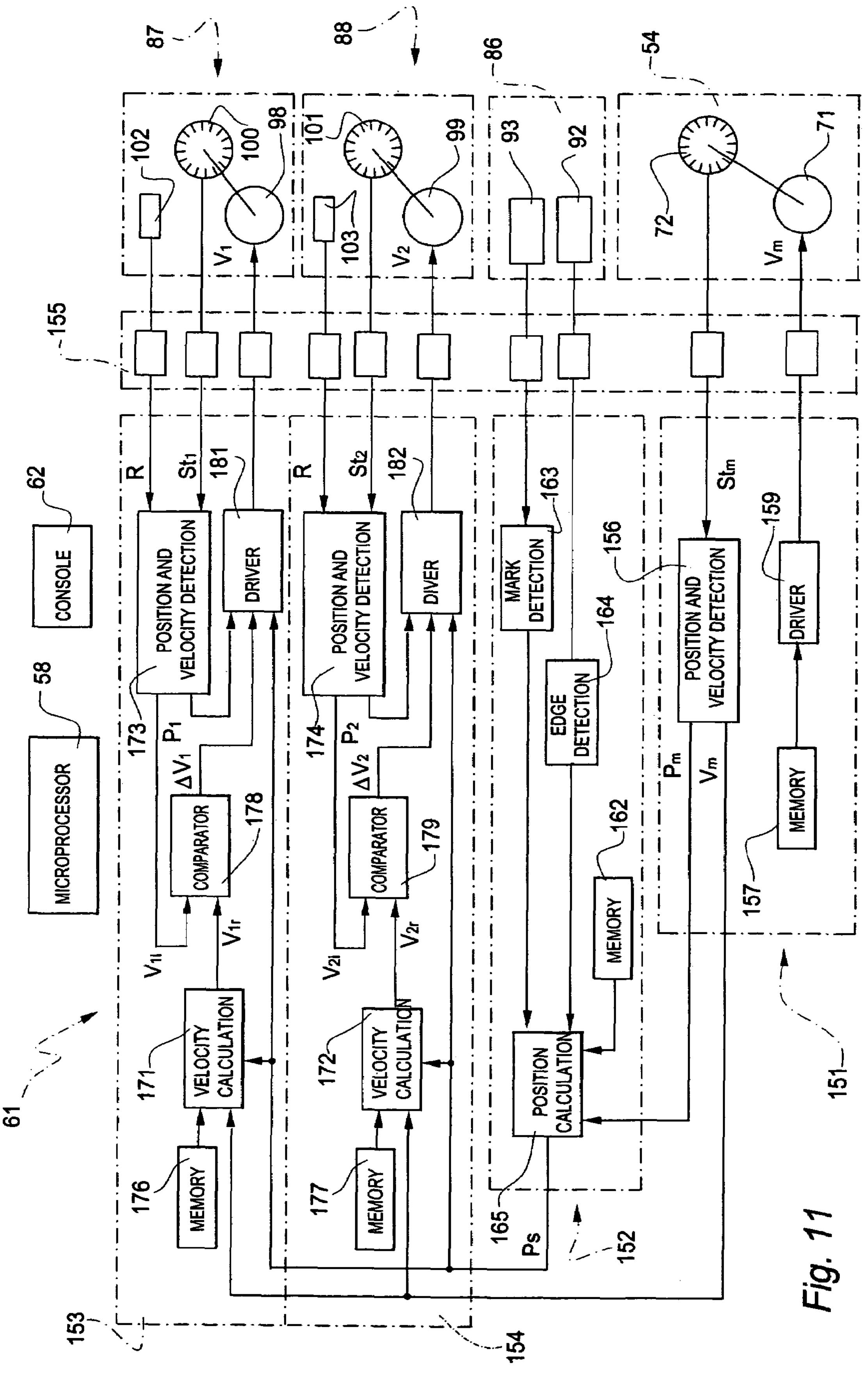
FIG. 11 represents a functional electric scheme of the punching equipment according to the invention.
Figure 12:
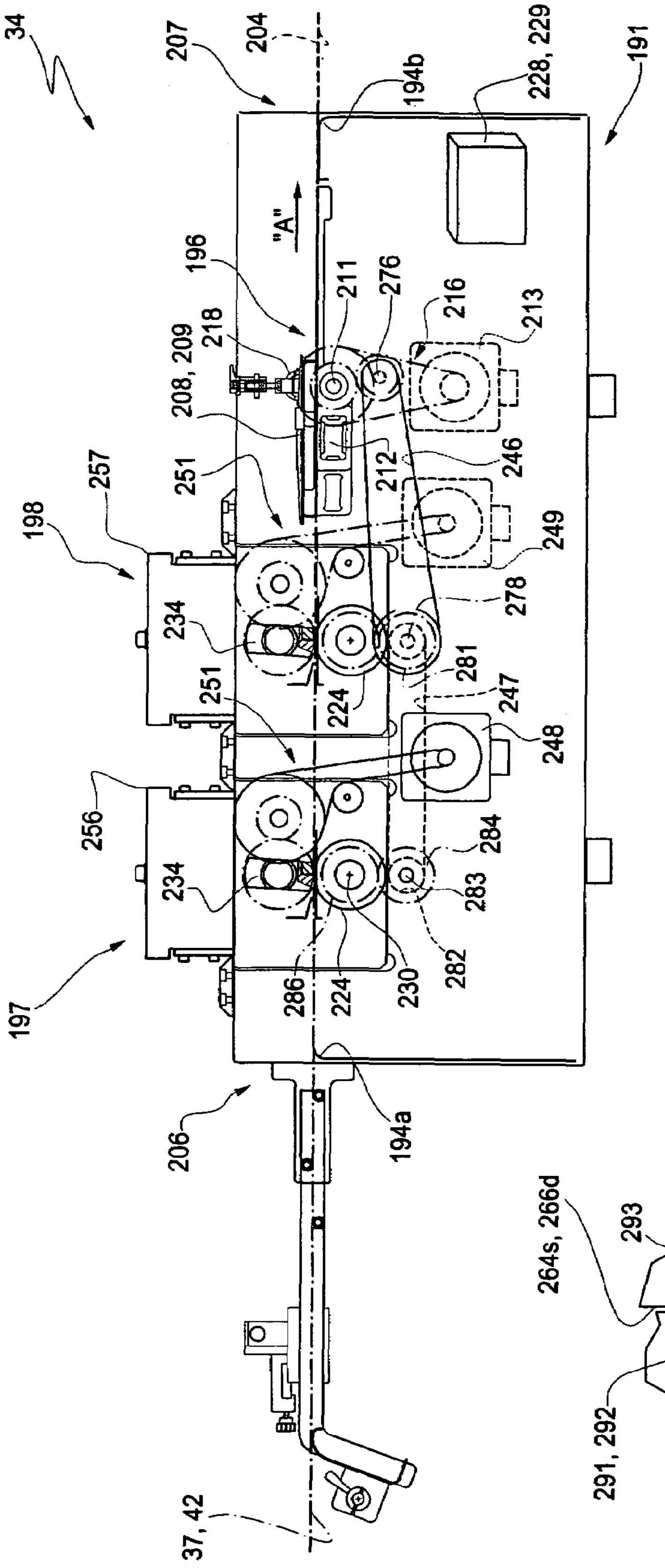
FIG. 12 shows a schematic sectioned side view of the perforating equipment of FIG. 1.
Figure 13:
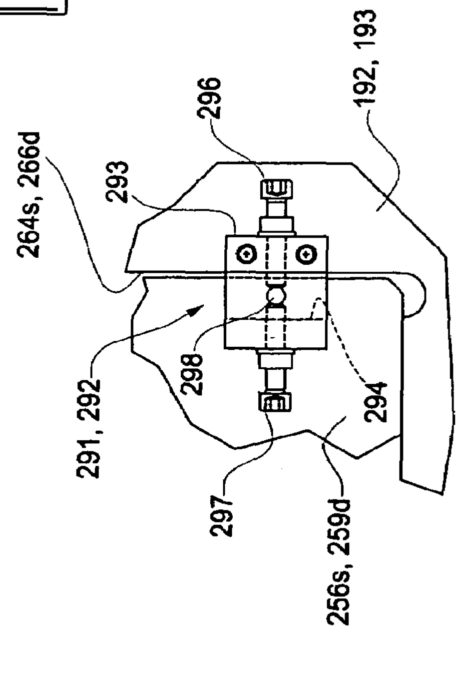
FIG. 13 represents, in enlarged scale, some details of FIG. 12.
Figure 16:
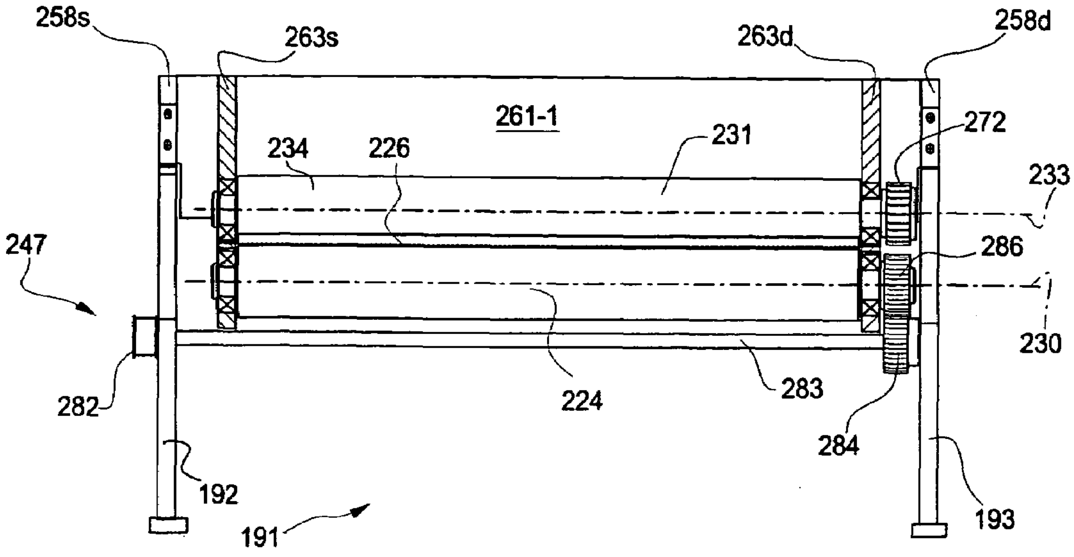
FIG. 16 shows a partial schematic front view of the perforating equipment of FIG. 12.
Figure 15:
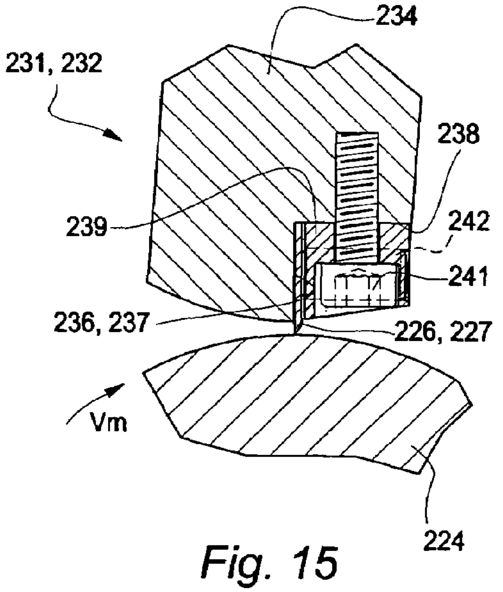
FIG. 15 shows, in a further enlarged scale, some details of FIG. 14.
Figure 14:
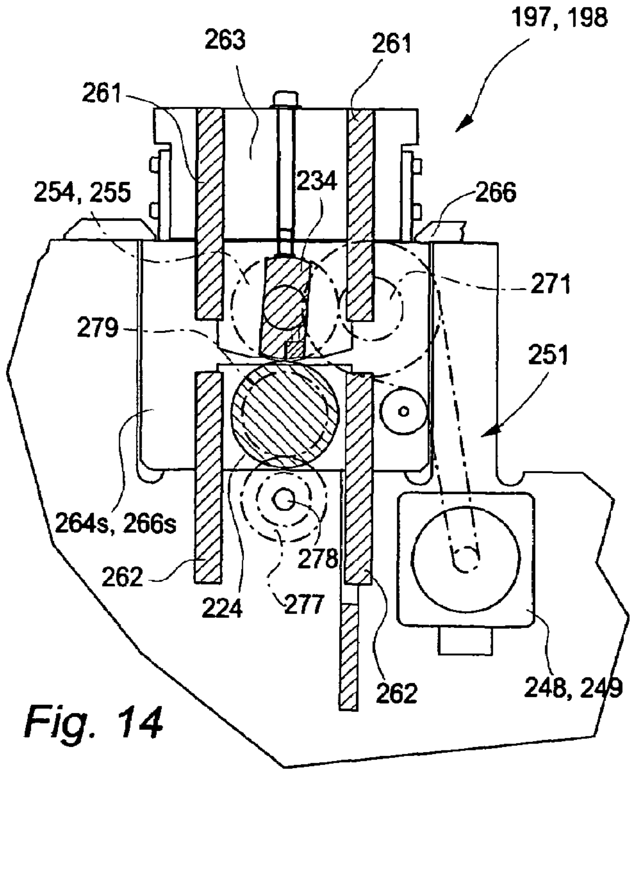
FIG. 14 represents, in enlarged scale, other details of FIG. 12.
Figure 17:
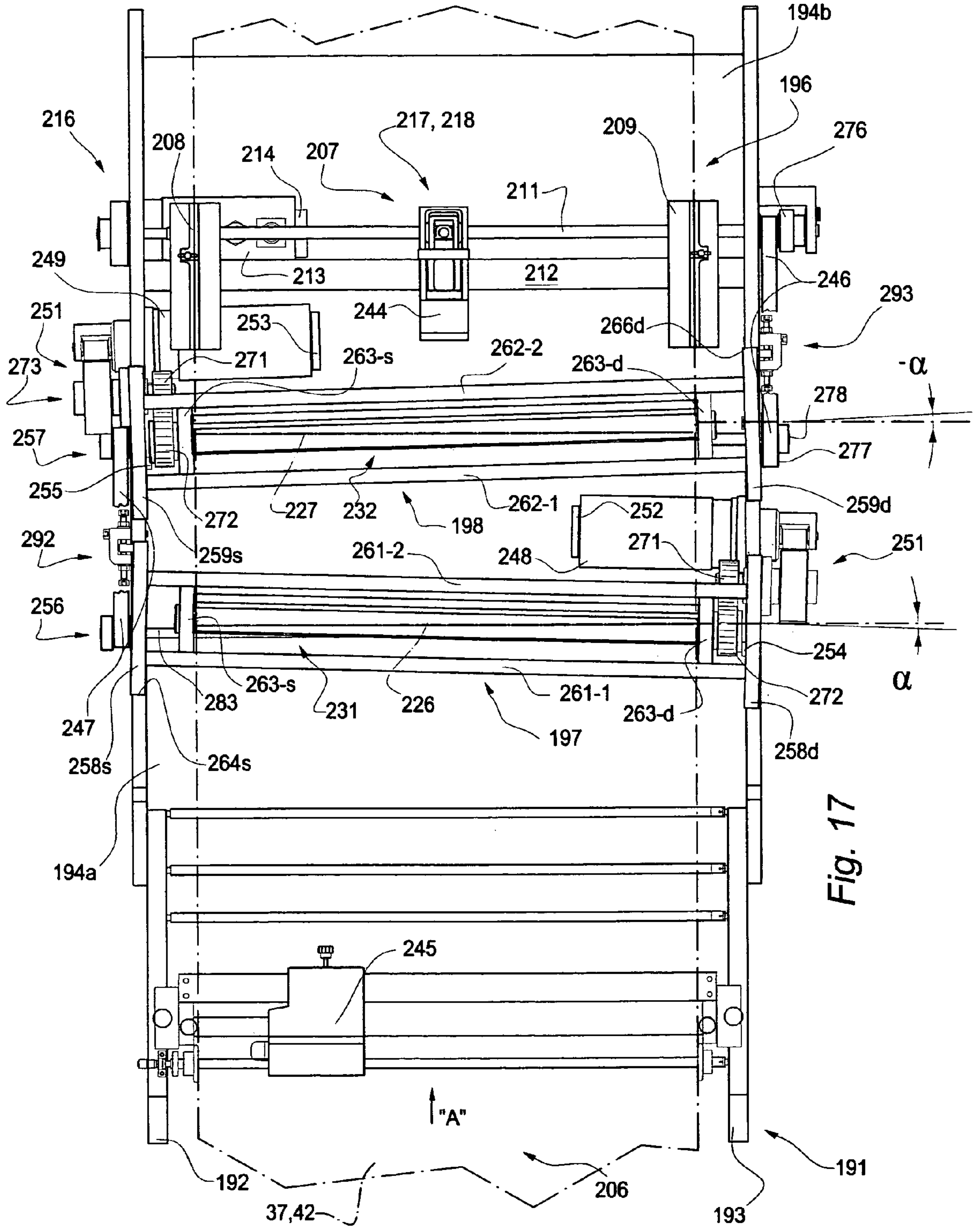
FIG. 17 represents a schematic plan view of the perforating equipment of FIG. 12.

With reference to the FIG. 11, the electronic module 61 drives the motor 71 of the moving device 54 on the basis of data set-up through the console 62 and the program of the microprocessor 58. Accordingly, the pins of the tractors or the motor roller 76 are actuated for advancing the continuous form 37, 42 at a velocity substantially constant Vm.

The electronic module 61 uses the pulses Stm of the encoder 72 for determining the start of the motors 98 and 99 and the pulses St1 and St2 of the encoders 101 and 102 for defining the positions and the velocities V1 and V2 of the motors 98 and 99.

Functional groups 151, 152 and 153, 154 are provided in the electronic module 61 for respectively controlling the moving device 54 and the detecting device 86 and define portions of the servomechanisms 87 and 88.

In particular, the module 61 obtains current position signals Pm, P1 and P2 and current velocity signals Vmi, V1i and V2i of the motors 71 or 78, 98 and 99 from the pulses Stm, St1 and St2 and on the basis of the program of the microprocessor 58. These values are associated to the current position and velocity of the form 37 or 42 and of the mechanisms 56 and 57.

An interface group 155 connects the functional groups 151, 152 and 153, 154 with the photoelectric cells of the sensors 92 and 93 and with the position encoders 72, 101 and 102 by means of suitable input/output circuits and drives the actuating motors 71, 98 and 99 by means of control power circuits known per se.

The group 151 is pre-set to drive the motor 71 under the control of the encoder 72. It includes, for instance, a position and velocity detecting circuit 156, a section of memory 157 with data of reference velocities and a driving circuit 159.

In response to the pulses "Stm" the circuit 156 feeds the current position signals Pm and the velocity signal Vm of the shaft of the motor 71 and, therefore, of the form 37, 42 to be punched.

The data of reference velocities for the form 37, 42 associated with the data set-up by the console 62 are stored in the section of memory 156 and the circuit 159 drives the motor 71 on the basis of these data.

The functional group 152 is connected to the detecting device 86 and comprises, for instance, a section of memory 162, a mark detecting circuit 163, an edge detecting circuit 164 and a position calculating circuit 165.

In the section of memory 162 are stored the data set-up by the console 62, on the length of the sheets 47. The calculating circuit 165 is synchronized by the sensor 92 or 93 and responds to the memorized idata and to the information of the circuit 156 to supply sheet position signals Ps associated to the reference edge of the single sheets 47 obtainable from the form 37, 42.

The functional groups 153 and 154 are pre-set to drive the motors 98 and 99, under the control of the encoders 100 and 101 and synchronized by the sensors 102 and 103 so as to put the punches 81 in engagement with the form 37, 42 and the dice 82 in the wished punching position of the form. Further the groups 153 and 154 drive the motors 98 and 99 according to a law of motion of the punches 81 and of the dice 82 such to cause the punches and the dice to reach a peripheral velocity equal to the velocity of the form 37, 42 and to maintain this velocity during the execution of the holes 38 and the extraction of the punches from the dice.

In synthesis, for what relates the control of the motors 98, 99, the group 153, 154 include, for instance, a position and time calculating circuit 171, 172 a position and velocity detecting circuit 173, 174, a section of memory 176, 177 with data of reference velocities, a comparing circuit 178, 179 and a driving circuit 181, 182.

The calculating circuits 171 and 172, in response to the sheet position signals Ps from the calculating circuit 165, the data of the portion of memory 176, 177 and the velocity signals Vm of the circuit 156 determine the instants of start of the motors 98 and 99 associated with the wished positions of punching and the reference velocities Vr1, Vr2.

The detecting circuits 173 and 174, in response to the signals "St1" and "St2" supply the current position signals P1 and P2 and the velocity signals V1i and V2i of the output shafts of the motors 98 and 99.

The circuits 178, 179 compares the velocity signals V1i V2i with the reference velocities V1r V2r of the calculating circuit 171, 172 and supply signals ΔV1, ΔV2. The circuits 181, 182 in response to the signals ΔV1, ΔV2, the signals Ps of the circuits 165, and the signals P1 and P2 actuate and start the motor 98, 99 for determining the punching of the holes in the wished positions and with a tangential velocity of the set of punches-dice equal to the velocity Vm of the form.

Figure 10:
FIG. 10 represents a schematic diagram of an operational way of the details of FIG. 8.

With reference to the FIG. 10, the peripheral velocities Vr1, Vr2 of the punches-dice couples include an acceleration portion Va1, Va2 referred to the time from the moment of start to the reaching of the velocity of the form, a constant portion at the velocity Vm for the time of engagement and disengagement of the couples and a breaking portion Vb1, Vb2 referred to the time from the moment of disengagement to the stop of the couples.

Thus, the law of motion of the mechanisms 57, 57 is such that the punches 81 of a couple start the perforation in a time "t1" in which the tangential velocity is already the one of the form and disengages him completely from the dice 84 and from the form in a time "t2" when the velocity is still equal to the one of the form in a very short time.

With the cross-wise structure of the punches, the rotation is of 90° for each cycle of perforation and, at the end of the cycle, the couples of the operated punches-dice are downstream from the area of perforation, while the following couples are immediately pre-set for executing a new cycle of punching.

Perforating Equipment

The perforating equipment 34 (FIGS. 12-18) has a support structure similar to the one of the punching equipment 33 and comprises a frame 191 with two sides 192 and 193 and elements of support and guide 194*a* and 194*b* for the form 37, 42.

A moving device 196 including pin tractors for the forms with side sprocket holes 37 and motor rollers and pinch rollers for the un-holed forms 42 is provided. The execution of the weakening perforations 39 is achieved by a perforating mechanisms or a pair of perforating mechanisms 197 and 198, each one having a perforating blade and a contrast roller of rotary type, as represented in the figures.

The equipment 34 includes a power and control system for the various electromechanic components, comprising a microprocessor 201 (FIG. 18) with a basic program, an electronic control module 202 and a control console 203.

The elements 194*a* and 194*b* (FIGS. 12 and 17) support and guide the form 37, 42 along a movement surface 204, substantially horizontal, in the sense of the arrow "A" between an input area 206 and an output area 207. The mechanisms 197 and 198 are arranged, one behind the other, beginning from the input area 206 and the moving device 196 is downstream of the mechanism 198, adjacent to the output area 207.

The moving device 196 includes two paper pressing members 208 and 209 with side guides, a motor shaft 211, a support bar 212 for the paper pressing members 208 and 209, a motor 213 with a position encoder 214 and a transmission assembly 216 with pulleys and toothed belts between the shaft 211 and the motor 213. The shaft 211 and the bar 212 are mounted between the sides 192 and 193 of the frame 191, the paper pressing members 208 and 209 have possibility of transversal regulation along the bar 212 and the motor 213 is mounted on the side 192.

Also the motor 213 is of brushless D.C. type and the encoder 214 supplies pulses Stm (FIG. 18) in response to given angular steps of the shaft of the motor 213 corresponding to incremental advancing steps of the form 37, 42 along the movement surface 204.

For the holed forms 37 (FIGS. 1 and 17) two tractors, not shown, are associated to the paper pressing members 208 and 209. The tractors are of endless belt type with dragging pins to cooperate with the sprocket holes 41 of the form 37, and in which the relative motor pulleys are connected in the rotation with the shaft 211.

For the unholed forms 42, the moving device 196 can include a motor roller 217 mounted on the shaft 211 and a pinch roller 218, both in central position.

The perforating mechanisms 197 and 198 include each one a contrast roller or anvil 224 and a perforation blade 226 or 227 with fine teeth and notches, controlled by servomechanisms 228 and 229. The contrast roller 224, in hard steel, is rotatable around a geometrical axis 230 and is substantially tangent to the movement surface 204 of the form 37, 42. The perforation blades 226 and 227 are carried by respective blade supports 231, 232 rotatable around respective geometrical axes 233 parallel to the axis 230.

In the use, the contrast roller 224 constantly rotates at a peripheral velocity Vm equal to the velocity of the form 37, 42. The blade supports 231, 232 are provided for intermittent rotation around the axis 233 to pass from a condition of rest in which the blade 226, 227 is disengaged from the roller 224 to a condition in which the blade interferes with the roller 224 for the execution of the weakening perforations 39 on the form and to return to the condition of rest.

According to the invention, for the rotation of the blade supports 231, 232, the servomechanisms 228 and 229 respond to indications of the wished positions of the weakening perforations of the form 37, 42. The shafts 230 and 233 of the contrast roller 224 and of the support 231 or 232 are inclined of a small angle "α" with respect to a reference axis perpendicular to the direction of movement "A" of the form 37 or 42 and the perforation blade 226, 227 (FIG. 17) have helix cutting edges inclined of the same angle "α" with respect to the reference axis.

The weakening perforations 39 are executed on the fly, in a progressive way, with the form in movement from a side edge to the other of the form, with limited strains in the involved components. It allows to provide light structures for the rotating masses and high velocity of response in the servomechanisms 228 and 229.

The angle "α" is included between 0.2° and 5°. Lower values would remarkably increase the strains between the blade 226, 227 and the roller 224, while greater angles would cause excessive deviations in the moving form with respect to the direction "A" and risks of jam. Excellent results have been achieved on limiting the inclination to a value between 0.5° and 1.5°.

The servomechanisms 228 and 229 have the possibility of actuating the perforating mechanisms 197 and 198 in alternate way for executing weakening perforations 39 of limited pitch and high velocity of the form.

According to another aspect of the invention, the geometric axes 230 and 233 (FIG. 16) of the contrast rollers 224 and of the supports 231 and 232 and, therefore, of the perforation blades 226 and 227 have opposite inclinations. As an example, if the angle of inclination of the axes 230 and 233 of the mechanism 197 is of +1°, the blade 226 (FIG. 17) is counter-clockwise inclined of 1°, while the angle of inclination of the axes 230 and 233 of the mechanism 198 is of −1° and the blade 227 is clockwise inclined of 1°.

This structure of the equipment 34 causes the perforations to start from the opposite side edges of the form 37 or 42 and from the edge adjacent to the side 192 for the mechanism 197 and, respectively, from the edge adjacent to the side 193 for the mechanism 198.

In dependence on technical requests the perforation blade 226 or 227 can extend for the whole width of the form 37, 42 or for one fraction thereof.

Figure 19:
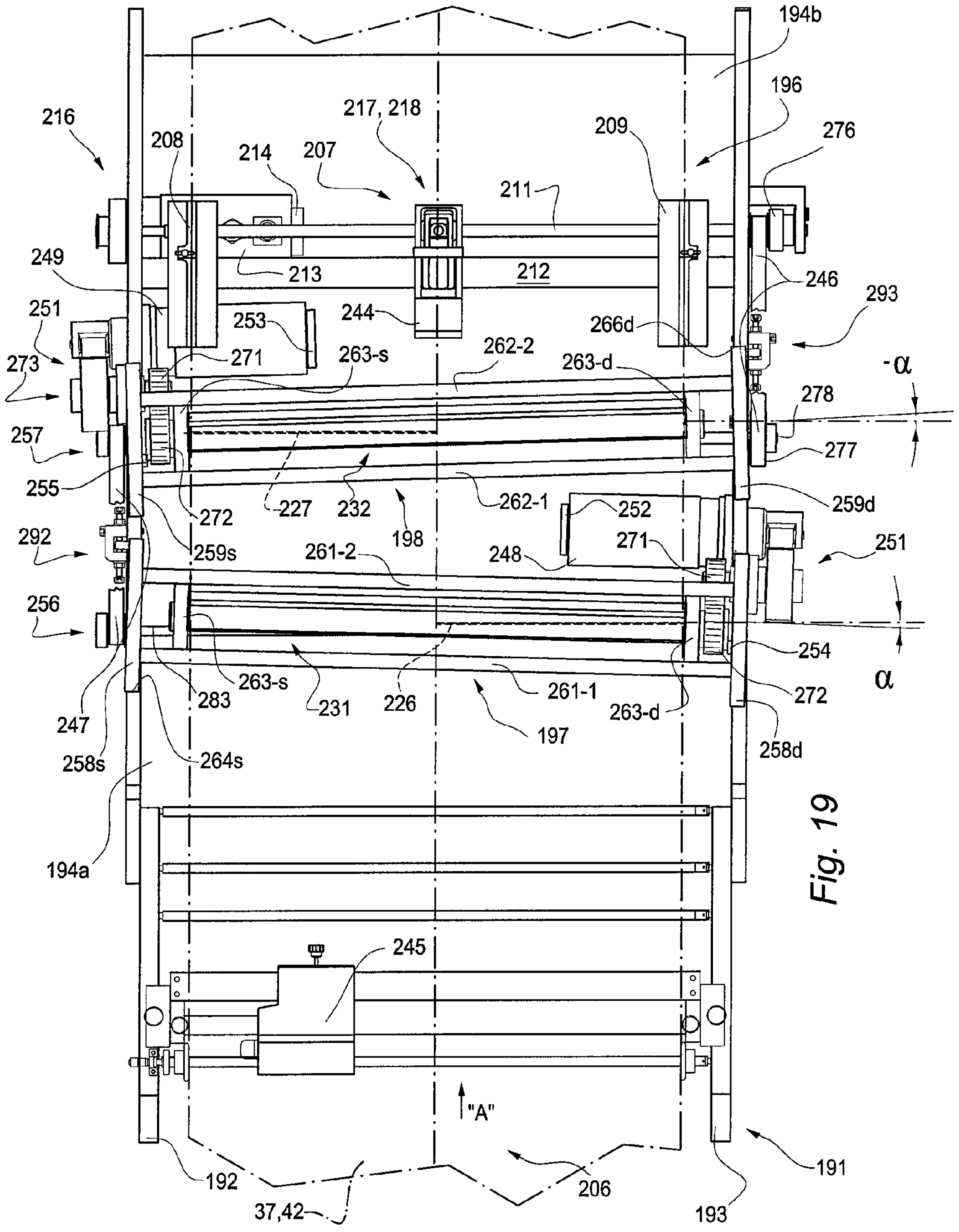
FIG. 19 shows a schematic plan view of another embodiment of the perforating equipment according to the invention.

For instance, in the case in which the form 37, 42 would be cut in longitudinal sense for documents formed according to the "two-up" technique, the blade 226 of the mechanism 197 (FIG. 19) extends for the first half of the width and executes the weakening perforations of the first half form, while the blade 227 of the mechanism 198 extends for the second half of the width and perforates the second half the form.

The weakening perforations 39 of each half form 37, 42 can be positioned in independent way. Further, with the disposition of the mechanisms 197 and 198 inclined by opposite sides, the perforations of the first fraction and of the second fraction of the form start for both halves form from the edges of the contrast rollers 224 adjacent to the supports of the sides 193 and 192 for operations noiseless and devoid of vibrations.

In detail, the support 231 or 232 (FIGS. 14 and 15) is constituted by a strong bar 234, of rectangular section and with terminal shaft portions, delimited by cylindrical sectors and the perforation blade 226, 227 is flexible and it is fixed against a respective helical shaped profile 236, 237 of the bar 234.

The bar 234 has a "L" shaped notch defined by a surface 238 parallel to the axis 230 and by the surface of the profile 237. The flexible blade 226, 227 is fixed against the profile 236, 237 through an iron member 239 firmly mounted against the profile 237 and the surface 238 through screws 241 and grub screws 242, for an easy amovability of the blade. The regulation of the blade is very simple being sufficient to lock the screws 241 and the grub screws 242 after registration at zero play of the various sections of the blade 226, 227 against the contrast roller 224.

The indications of position of the weakening perforations of the continuous form 37, 42 can be similar to those provided for the punching of the equipment 33 and are revealed by a detecting device 243 (FIG. 18) similar to device 86 already described.

The servomechanisms 228 and 229 respond to the indications of position of the form to put each blade 226, 227 (FIG. 14) in interference with the roller 224 in the punching positions, with a peripheral velocity of the cutting edges substantially equal to the moving velocity of the form 37, 42.

Also in this case, the indications on the positions of the weakening perforations 39 are referred either to the leading edge 90 (FIG. 1) for the holed forms 37 or by the reference marks 91 for the forms 42 devoid of holes.

The detecting device 243 (FIGS. 17 and 18) includes therefore a photoelectric synchronizing sensor 244 between the paper pressing members 208 and 209 to detect the edge 90 of the form 37 and a photoelectric sensor 245 adjacent to the input area 206 to recognize the marks 91 of the sheet 44. The electronic module obtains therefore the indications of position from the pulses Stm of the encoder 214 syncronized by the sensor 244 or from the sensor 245.

Figure 18:
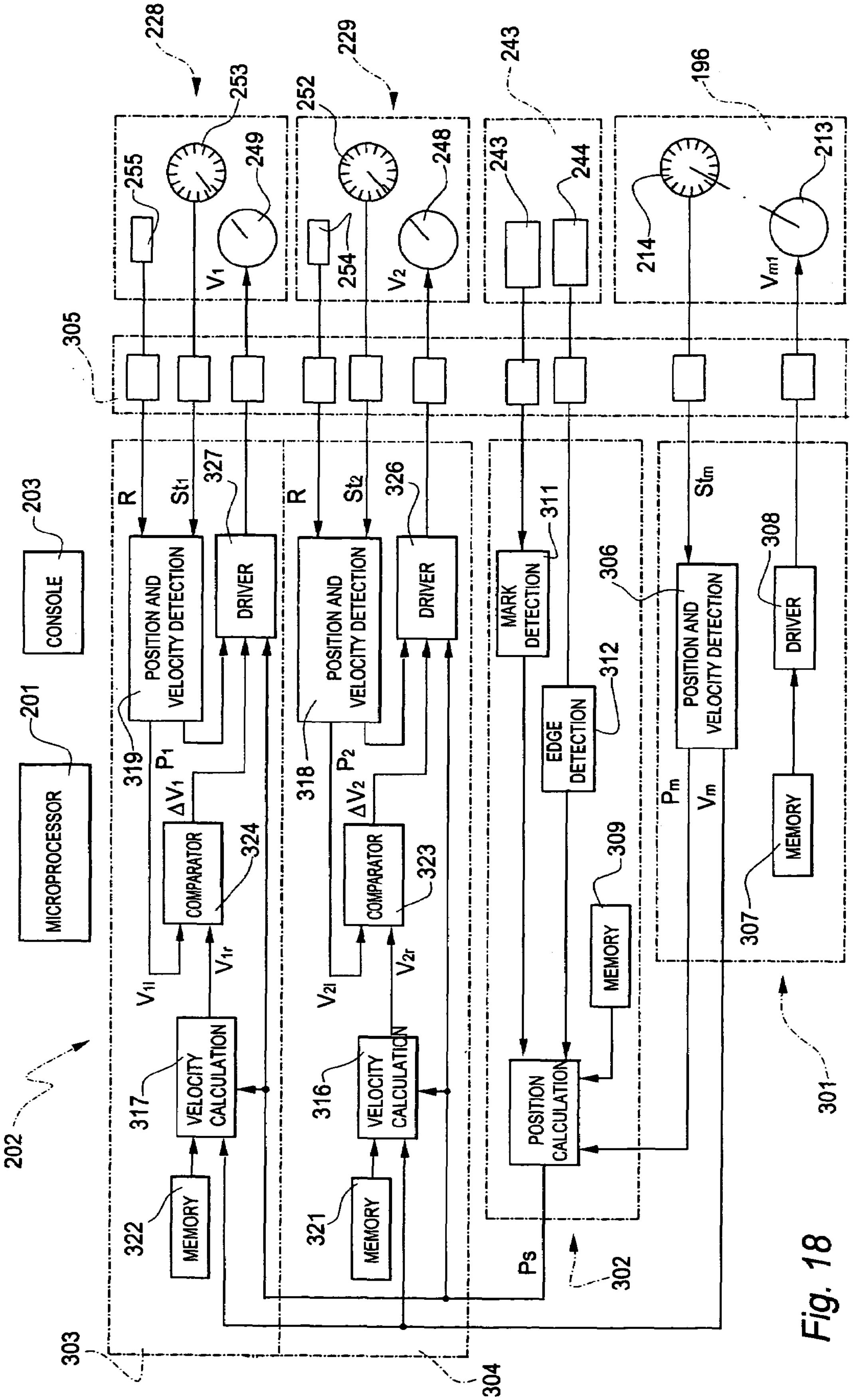
FIG. 18 represents a functional electric scheme of the perforating equipment according to the invention.

In detail, the perforating mechanisms 197 and 198 (FIGS. 12 and 17) include a single transmission assembly 246 in connection with the motor 213 and an intermediate transmission assembly 247 for the contrast rollers 224 and respective motors 248 and 249 of the servomechanisms 228 and 229 and transmission assemblies 251 for the blade supports 231 and 232. Also the motors 248 and 249 are of brushless D.C. type and the positions of the motor shafts are defined by position encoders 252 and 253, with generation of pulses St1 and St2 (FIG. 18).

Two inductive position sensors 254 and 255 (FIG. 17) recognize the zero reference positions of the supports 231 and 233 to which correspond the reference states of rest of the blades 236, 237 and of disengagement from the contrast rollers 234.

Also the mechanisms 197 and 198 are mounted on respective modular groups 256 and 257 manually detachable and remountable with respect to the frame 191.

The modular groups 256 and 257 (FIGS. 14, 16 and 17) have small sides **258*s* and 258*d*; 259*s* and 259*d*, higher crossbars 261 and lower crossbars 262 fixed to the small sides and intermediate walls 263*s* and 263*d*; 264*s* and 264*d* for the supports blade 231 and 232 and for the contrast rollers 224. The small sides 258*s* and 258*d*; 259*s* and 259*d* are mounted, with precision and with possibility of removal, in couples of notches 264*s*, 264*d* and 266*s*, 266*d* obtained in the sides 192 and 193**, beginning from the higher edges.

The motors 248 and 249 are respectively mounted on the side 193 and on the side 192 of the frame 191 and each transmission assembly 251 includes an intermediate toothed belt, a pinion 271 and a gear 272. The intermediate toothed belt connects the output shaft of the motor 248 or 249 with the pinion 271 on an intermediate shaft 273 of the small side **258*d* and, respectively, 259*s*. The gear 272 is keyed on a cantilever end of a shaft portion of the bar 234 external to the wall intermediate 263 and it is in meshing with the pinion 271**.

For the motorization of the rollers 224, the transmission assembly 246 (FIGS. 12 and 17) includes a gear 276 which derives the motion from the transmission assembly 216, an intermediate toothed belt and a pinion 277 keyed on an intermediate shaft 278 rotatable between the sides 192 and 193. The pinion 277 of each mechanism 197 and 198 is in mesh with a gear 279 of the form 257, keyed on an end of the axis of the contrast roller 224 adjacent to the small side **259*s***.

The intermediate transmission assembly 247 includes in turn a toothed pulley 281 keyed on the end of the shaft 278 to the outside of the side 193, a toothed belt, a toothed pulley 282 engaged by the toothed belt and keyed on a shaft 283 rotatably supported between the sides 192 and 193 and a gear 284 in engagement with a gear 286 of the form 258, keyed on an end of the axis of the contrast roller adjacent to the small side 258d.

The modular groups 136 and 137 are fixed on the higher edges of the sides 192 and 193 by means of locking elements and keys, not shown, cooperating with the small sides **258*d* and 259*s*. For the removal, it is sufficient to remove the toothed belt of the transmission assemblies 251, disengage the small sides and lift the modular groups from the frame 191**.

The removability of the modular groups ensures an easy substitution of the mechanisms 197 and 198, minimizing the downtimes in case of replacement of the blades and, in general, in the normal maintenance. The substitution of the mechanisms 197 and 198 with others of different typology is also simplified.

According to a further characteristic, the set of perforation blade and contrast roller is mounted with possibility of micrometric regulation of the inclination with respect to the direction of advancing "A" of the form. To this end, there are provided two adjusting blocks 291 and 292 (FIGS. 13 and 17) arranged at the sides 193 and 192 and which operate on the groups 256 and 257 by opposite parts with respect to the keys of connection with the sides 192 and 193.

Each block 291, 292 is of substantially parallelepipedal shape and includes a section fixed on the side 192, 193 and a section cantilevered with respect to the notches **256*s*, 256*d*. The cantilevered section defines a vane 294 and on it are mounted two adjusting screws 296 and 297 whose ends project in the vane 294**.

A pin 298 is projecting from the small side **256*s*, 259*d* and, when the modular group 256, 257 is installed, it is lodged in the vane 29 of the block 291, 292**.

By loosening and locking the screws 296, 297 against the pin 298, the groups 256 and 257 can rotate around the keys of connection with the sides 192 and 193. With this adjustment it is possible to modify in micrometric way the angle "α" of the two mechanisms 197 and 198, up to when the weakening perforations 39 result perfectly perpendicular to the longitudinal axis of the form 37, 42.

The electronic module 202 (FIG. 18) is similar to the module 61 and includes functional groups identified as 301, 302 and 303, 304, identical to the groups 151, 152 and 153, 154 to control the moving devices 196, a detecting circuit 243 and included in the servomechanisms 228 and 229 and an interface group 305.

On the basis of the program, the module 202 obtains, from the pulses Stm, St1 and St2 current position signals Pm, P1 and P2 and velocity signals Vmi, V1i and V2i of the motors 213, 248 and 249 and therefore of the form 37 or 42.

The group 301 is pre-set to actuate the motor 213 on control of the encoder 214 and it includes a position and velocity detecting circuit 306, a section of memory 307 with data of reference velocities and a driving circuit 308 to drive the motor 213 at the velocity Vm on the basis of the data set-up by the console 203.

The functional group 302 controls the detecting device 243 and comprise, as an example, a section of memory 309, a mark detecting circuit 311, an edge detecting circuit 312 and a position calculating circuit 313, similar to the circuits 163, 164 and 165 and in which the calculating circuit 313 is syncronized by the sensors 243 or 244 and respond to the memorized information and to the one of the circuit 306 to define the position of a reference edge of the single sheets 47 obtainable by the form 37, 42.

The functional groups 303, 304 are pre-set to drive the motors 248 and 249, on control of the encoders 252 and 253, syncronized by the sensors 244 and 245 so as to put the blades 226, 227 in engagement with the form 37, 42, against the rollers 224 in the wished positions. Further, the groups 303, 304 drive the motors 248 and 249 for a law of motion of the blades 226, 227 such to reach the peripheral velocity Vm and maintain the blades at the velocity Vm during the execution of the weakening perforations 39.

Also the groups 303, 304 include a position and time calculating circuit 316, 317 a position and velocity detecting circuit 318, 319, a section of memory 321, 322 with data of reference velocities, a comparing circuit 323, 324 and a driving circuit 326, 327. The circuits 316 and 317, in response to the signals Ps from the circuit 313, to the data of the memory 321, 322 and to the signal Vm of the circuit 306 determine the instants of start of the motors 248 and 249 for the punching positions and the current reference velocities Vr1, Vr2.

The circuits 323, 324 compare the velocity V1, V2i of the detecting circuits 318 and 319 with the reference velocities V1r V2r coming from the calculating circuit 316, 317, supplying control signals ΔV1, ΔV2 and the circuits 326, 327 actuate and start the motors 248, 249.

Naturally, the embodiments and the details of construction may be largely varied with respect to what has been described and illustrated purely by way of non-restrictive example, without departing from the scope of this invention

We claim:

1. A perforating equipment for continuous paper forms comprising a contrast roller substantially tangent to the movement surface of the form, a perforating blade carried by a blade support provided for rotation in a condition of interference with said form against the contrast roller for the execution of transversal weakening perforations on the form in movement, said form having a given width and being provided for being longitudinally cut into continuous forms of half width, wherein the contrast roller and the blade support are rotatably supported by side bearings and have respective rotation axes parallel one another and slightly inclined with respect to a reference axis perpendicular to the direction of movement of the form;

wherein the perforation blade is defined by a helical cutting edge with fine teeth having an inclination angle equal to the angle of inclination of said rotation axes with respect to the reference axis for a progressive perforating in a first direction from a side edge of said form; and wherein said equipment comprises two sets of perforating blade and contrast roller arranged one behind the other along the direction of movement of the paper form;

said equipment further comprising a moving device engaging the perforated form downwardly with respect to the sets of perforating blade and contrast roller and two respective servomechanisms responsive to position indications of the form for independently rotating the blade support of said two sets of perforating blade and contrast roller from a condition of disengagement of the perforation blade to the condition of interference and to the condition of disengagement;

said servomechanisms providing a peripheral velocity of the perforation blade of said two sets of perforating blade and contrast roller, at the moment of the perforation, equal to the moving velocity of said paper form;

wherein the perforating blade of one of the two sets of perforating blade and contrast roller extends along the respective blade support for a length equal to a first half of the given width of the paper form for executing a weakening perforation on a first half of the continuous paper form; and wherein the perforating blade of the other of the two sets of perforating blade and contrast roller extends along the respective blade support for a length equal to a second half of the paper form for executing a weakening perforation on a second half of the continuous paper form independently of the perforation on the first half of the form;

the perforating blade and the contrast roller of the one of the two sets of perforating blade and contrast roller and the contrast roller of the other of the two sets of perforating blade and contrast roller and the respective helical edges of said perforating blades having opposite inclinations with respect to the reference axis, to begin the perforations from opposite side edges of said paper form, staffing from the edges of the paper form adjacent to the side bearings.

2. Equipment according to claim 1, wherein said moving device includes a first motor, a motor roller and a pinch roller for the advancing of the paper form at a given advancing velocity, wherein said motor roller and said pinch roller operate on a central section of the form downwardly from said sets of perforating blade and contrast roller and wherein said first motor is provided for rotating the contrast roller of each one of the two sets of perforating blade and contrast roller at a peripheral velocity equal to said advancing velocity.

3. A perforating equipment for continuous paper forms comprising a moving device for advancing a paper form at a given advancing velocity, a first set of perforating blade and contrast roller including a contrast roller substantially tangent to the movement surface of the form, and a perforating blade carried by a blade support provided for rotation in a condition of interference with said form against the contrast roller for executing transversal weakening perforations on the continuous form in movement, and a first servomechanism responsive to position indications of the form for rotating said blade support from a condition of disengagement of the perforation blade to the condition of interference and to the condition of disengagement, said equipment further comprising:

a second set of perforating blade and contrast roller having another contrast roller and another blade support with another perforating blade arranged behind said first set of perforating blade and contrast roller along the direction of movement of the paper; and said first and second perforating blades each independently perforate a respective half of said form a second servomechanism responsive to position indications of the form for rotating the other blade support of the second set of perforating blade and contrast roller for executing other transversal weakening perforations on the continuous form independently of the perforations of the first set of perforating blade and contrast roller;

wherein said moving device operates on a central area of the perforated continuous form downwardly with respect to the second set of perforating blade and contrast roller;

wherein the contrast roller and the blade support of said first set of perforating blade and contrast roller have respective rotation axes parallel one another and slightly inclined in a given sense with respect to a reference axis perpendicular to the direction of movement of the form; and wherein the perforation blade is defined by a helical cutting edge with fine teeth, having an inclination angle equal to the angle of inclination of said rotation axes with respect to the reference axis for a progressive perforating in a first direction, starting from said given side edge;

the other contrast roller and the other blade support of said second set of perforating blade and contrast roller having respective rotation axes parallel one another and slightly inclined in a sense opposite to said given sense with respect to another reference axis perpendicular to the direction of movement of the form, and the other perforation blade being defined by a helical cutting edge with fine teeth, having an inclination angle equal to the angle of inclination of said other rotation axes to begin the perforations in a second direction opposite the first direction, starting from said other side edge thereby avoiding simultaneous weakening actions on a same side of the equipment in the case of simultaneous starting of the perforation by the first set and the second set of perforating blade and contrast roller.

4. Equipment according to the claim 3, wherein each one of said axes is inclined by an angle included between 0.5° and 1.5°.

5. Equipment according to claim 3, further comprising a frame, two modular groups mounted on said frame and adjusting screw means interposed between said frame, and each of said modular groups, wherein said first set of perforating blade and contrast roller and said second set of perforating blade and contrast roller are, respectively, mounted on said modular groups, said adjusting screw means providing possibility of very small regulation of the angle of inclination of the rotation axes with respect to the reference axis for causing the inclination of the transversal weakening perforations to be exactly perpendicular to the direction of advancing of the paper form.

6. Equipment according to claim 3, further comprising a frame and two modular groups mounted on said frame, wherein said first set of perforating blade and contrast roller and said second set of perforating blade and contrast roller are, respectively, mounted on said modular groups, and wherein said modular groups have possibility of removal and manual remounting with respect to said frame, said first servomechanism and said second servomechanism including each one a respective motor mounted on the modular groups for the rotation of said blade support and of said other blade support, and wherein the motor of the first servomechanism is arranged, in the use, adjacent to a side of said frame, while the motor of the second servomechanism is arranged, in the use, adjacent to an opposite side of said frame.

* * * * *

UNITED STATES PATENT AND TRADEMARK OFFICE

CERTIFICATE OF CORRECTION

PATENT NO. : 7,484,445 B2 
APPLICATION NO. : 10/859071
DATED : February 3, 2009
INVENTOR(S) : Giuliano De Marco et al.

It is certified that error appears in the above-identified patent and that said Letters Patent is hereby corrected as shown below:

On the Title Page, Foreign Application Priority Data Item (30):
Please insert: --June 4, 2003 (IT) 2003000418--

In Column 14, Claim 1, Line 49:
Please replace “staffing” with --starting--

Signed and Sealed this

First Day of September, 2009

David J. Kappos

David J. Kappos
*Director of the United States Patent and Trademark Office*